United States Patent
Bullard et al.

[19]

[11] Patent Number: 5,836,566
[45] Date of Patent: Nov. 17, 1998

[54] CONNECTOR MECHANISM FOR A VALVE SPOOL AND A DIAPHRAGM

[75] Inventors: David E. Bullard, Washington; Gregory A. Menke, East Peoria; James G. Starling, Pekin; Daniel J. Whiting, Bloomington, all of Ill.

[73] Assignee: Caterpillar Inc., Peoria, Ill.

[21] Appl. No.: 920,262

[22] Filed: Aug. 22, 1997

[51] Int. Cl.⁶ .................................................. F16K 31/145
[52] U.S. Cl. ..................................... 251/61.2; 137/625.25
[58] Field of Search .................................. 251/61.2, 61.3, 251/61.4, 335.2; 137/625.69, 625.25

[56] References Cited

U.S. PATENT DOCUMENTS

| | | |
|---|---|---|
| 3,614,055 | 10/1971 | Douglas .................................. 251/61.2 |
| 3,862,645 | 1/1975 | Bianchetta et al. . |
| 3,882,900 | 5/1975 | Williams .............................. 251/61.3 X |
| 3,982,559 | 9/1976 | Ochs ..................................... 251/61.2 X |
| 4,133,510 | 1/1979 | Lorimor . |
| 4,344,287 | 8/1982 | Sindelar . |

*Primary Examiner*—Kevin Lee
*Attorney, Agent, or Firm*—J. W. Burrows

[57] ABSTRACT

A connector mechanism is provided to connect a spool in an air actuated valve to the diaphragm of an air actuating mechanism in order to permit rotational movement of the spool relative to the diaphragm. The connector mechanism includes a connector member having one end thereof firmly connected to the diaphragm and the other end thereof connected to one end of the spool and retained thereto by a retainer member which permits free rotation of the spool relative to the diaphragm during use of the air actuated valve.

7 Claims, 2 Drawing Sheets

CONNECTOR MECHANISM FOR A VALVE SPOOL AND A DIAPHRAGM

TECHNICAL FIELD

This invention relates generally to an air actuated valve and more particularly to an air actuated valve wherein the spool is rotatable relative to a diaphragm that separates an air actuating chamber from the hydraulic chambers.

BACKGROUND ART

It is known to keep a linear spool from rotating during operation by providing a mechanical mechanism that acts in cooperation with the spool to keep it from rotating during use. It is also known to use diaphragms to separate an air actuating chamber from the hydraulic chambers by securing the diaphragm to the spool and to the housing in which the spool is disposed. It is also known that, during use, spools in hydraulic valves are caused to rotate or at least have a tendency to rotate due to the flow forces created thereon as the flow is being directed across the metering slots disposed between the spool and the housing. However, in these air actuated valves using diaphragms secured to the spool, the continued rotational movement or at least attempted movement of the spool relative to the fixed diaphragm causes the diaphragm to prematurely fail due to fatigue.

The present invention is directed to overcoming one or more of the problems as set forth above.

DISCLOSURE OF THE INVENTION

In one aspect of the present invention a connector mechanism is provided and adapted to permit relative rotation between a spool of an air actuated valve and a diaphragm of an air actuating mechanism. The air actuated valve has a housing, a spool slideably disposed in a bore defined in the housing, and first and second spaced apart ports defined in the housing and connected to the bore. The air actuating mechanism has a housing connected to the housing of the air actuated valve, an actuator member connected to the spool at one end thereof, an air chamber, and a diaphragm connected between one of the housings and the air actuator member. A connector member is firmly connected to the actuator member and the diaphragm at one end of the connector member and connected at the other end thereof to one end of the spool in a manner to permit relative rotation therebetween.

BEST MODE FOR CARRYING OUT THE INVENTION

Figure 1:
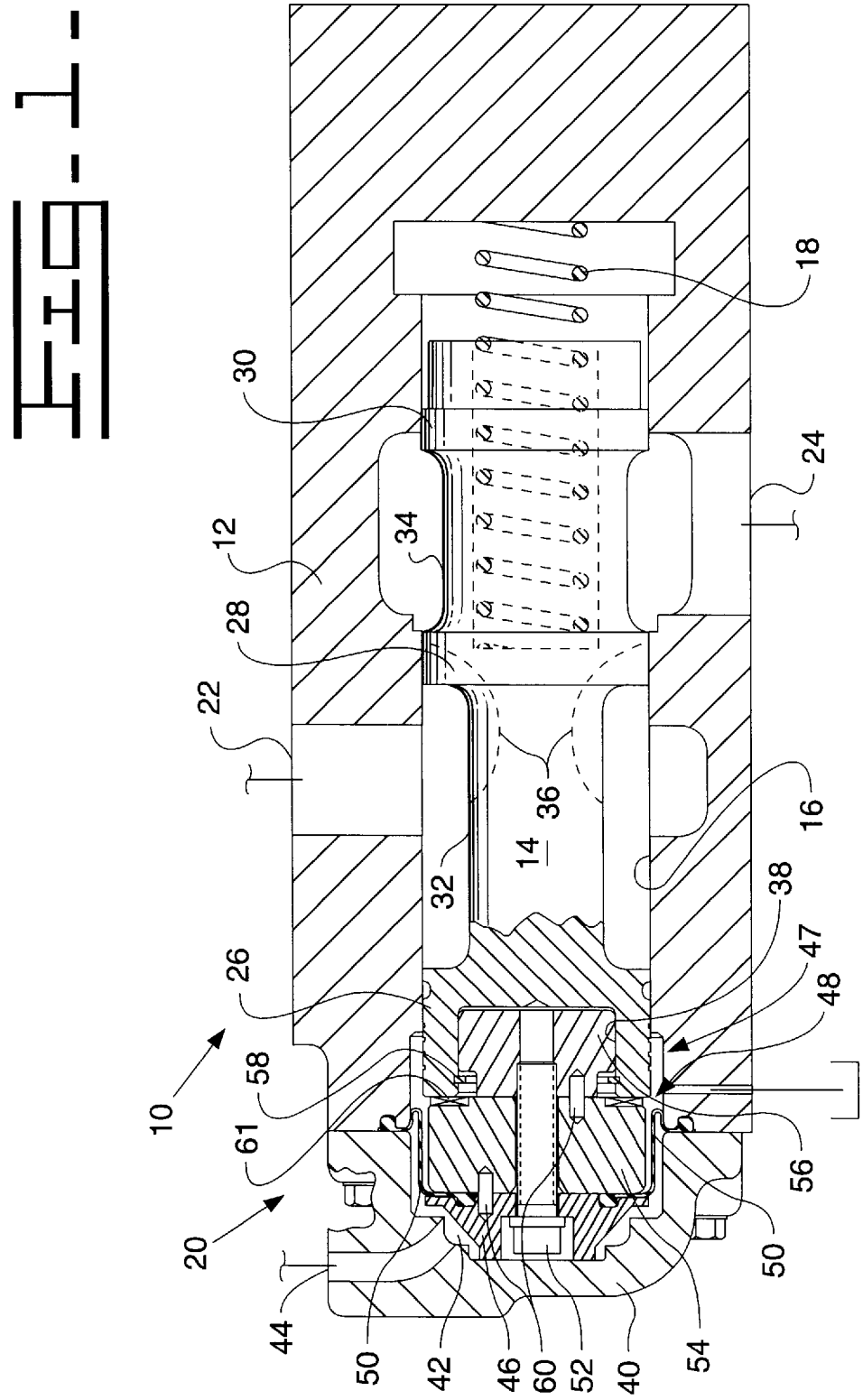
FIG. 1 is a diagrammatic representation of an air actuated valve including an embodiment of the subject invention.

Referring to the drawings, and more particularly to FIG. 1, an air actuated valve 10 is illustrated and includes a housing 12, a spool 14 slideably disposed in a bore 16 defined in the housing 12, a biasing mechanism 18 disposed at an end of the spool 14 between the spool and the housing 12, and an air actuating mechanism 20 connected to the housing 12 and being disposed at the other end of the spool 14.

The housing 12 has first and second ports 22,24 disposed therein spaced from one another and in communication with the bore 16. It is recognized that the housing 12 could have various ports in communication with the bore 16 without departing from the essence of the subject invention.

The spool 14 has a plurality of lands 26,28,30 that are used to permit sliding of the spool within the bore 16 and to provide sealing therebetween. Various grooves are formed on the spool 14 to form fluid chambers 32,34 within the bore 16 which permit communication of fluid flow between the first and second ports 22,24 across the spool 14. It is recognized that various lands and grooves could be formed on the spool 14 without departing from the essence of the subject invention. Metering slots 36 are defined in the land 28 of the spool 14 in a well known manner. A blind bore 38 is defined in the spool 14 on the end thereof opposite the biasing mechanism 18.

The air actuating mechanism 20 includes a housing 40 having an air chamber 42 defined therein, an air inlet port 44 connected to the air chamber 42, an actuator member 46, a connector mechanism 47, a diaphragm 50, and a fastener 52. The connector mechanism 47 of the subject embodiment includes a connector member 48 that is composed of first and second members 54,56.

One portion of the diaphragm 50 is sealing secured between the actuator member 46 and the first member 54 of the connector member 48 and another portion thereof is secured between the housing 12 of the air actuated valve 10 and the housing 40 of the air actuating mechanism 20.

The second member 56 of the connector member 48 is disposed in the blind bore 38 of the spool 14 and maintained therein by a retainer member, such as a snap ring 58. The actuator member 46, and the first and second members 54,56 are restrained from relative rotation with each other by respective pins 60 and secured together by the fastener 52.

A bearing member 61 is disposed between the one end of the spool 14 and the side of the first member 54. The bearing member 61 could be made from a bearing material or could be in the form of rollers. The bearing member 61 functions to enhance freedom of rotational movement between the spool 14 and the connector member 48. It is recognized that the bearing member could be disposed between the bottom of the blind bore 38 and the end of the connector member 48 without departing from the essence of the subject invention. For example, a recess centrally located at the bottom of the blind bore 38 could receive a single roller bearing that would be in contact with the end of the connector member 48 to enhance the freedom of rotational movement between the spool 14 and the connector member 48.

Figure 2:
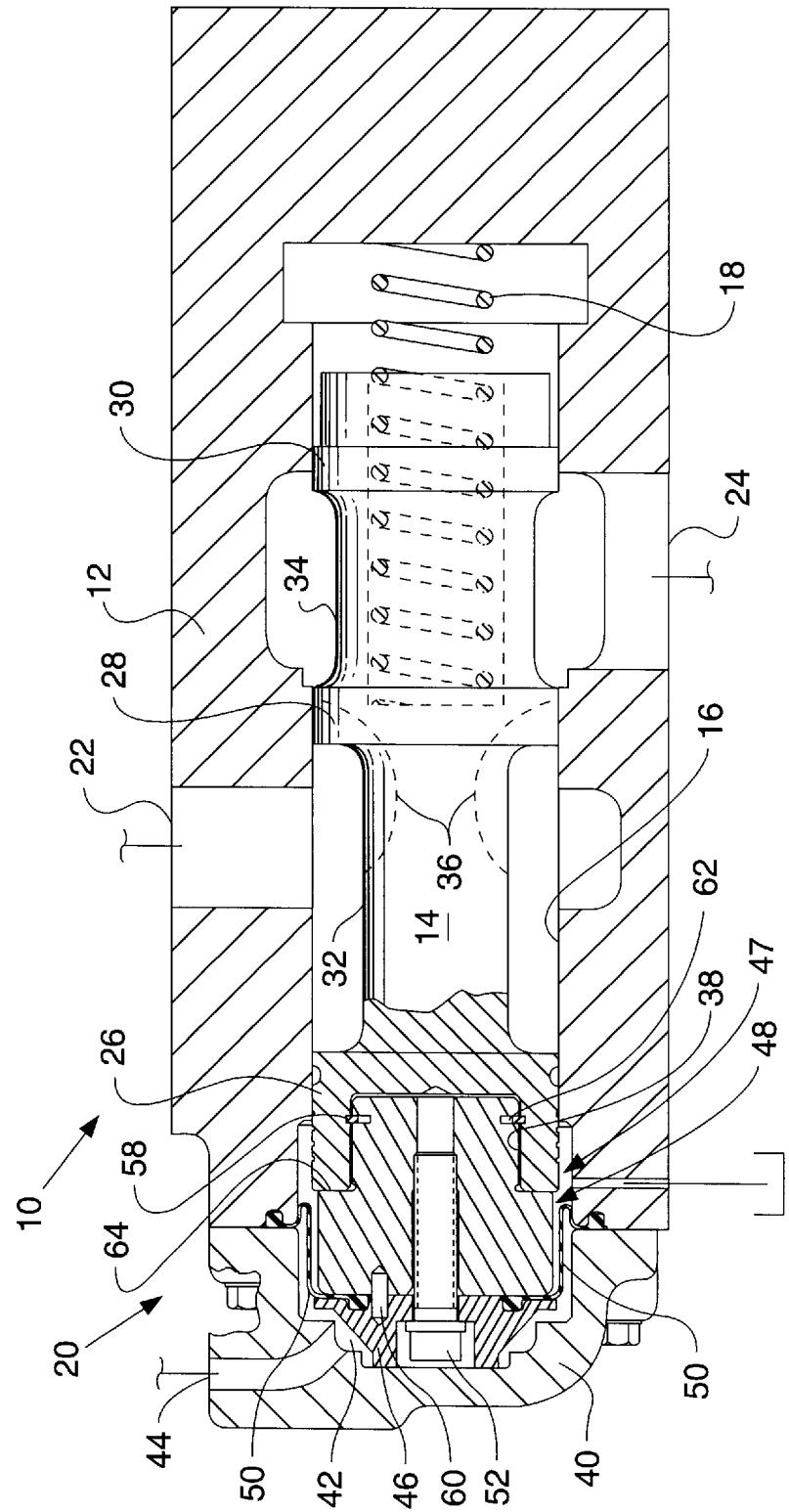
FIG. 2 is a diagrammatic representation of an air actuated valve including another embodiment of the subject invention.

Referring to FIG. 2, another embodiment of the subject invention is illustrated. The embodiment of FIG. 2 is similar to that of FIG. 1. Consequently, like elements have like element numbers.

The only difference between the two embodiments is the connector member 48 and the location of the snap ring 58 in the blind bore 38 of the spool 14. The connector member 48 of FIG. 2 is a single member and the other end thereof has a relief groove 62 for the snap ring 58 to be received in during the assembly of the connector member 48 into the blind bore 38 of the spool 14. It is recognized that the bearing member 61 could be disposed between the end of the spool 14 and a shoulder 64 of the connector member 48.

Industrial Applicability

In the operation of the air actuated valve 10 disclosed in FIG. 1, introduction of pressurized air into the air chamber 42 urges the actuator member 46 towards the right as viewed in the drawing. The diaphragm 50 keeps the air separated from the hydraulic fluid being controlled by the spool 14. As the actuator member 46 moves to the right, it pushes the spool 14 rightward against the bias of the biasing mechanism 18. Once the metering slots 36 open to the fluid chamber 34, flow passes from the first port 22 to the second port 24. Due to the flow of fluid across the spool 14, flow forces are induced into the spool 14 urging it to rotate within the bore 16. Since the second member 56 is slideably disposed in the blind bore 38 of the spool 14, the spool 14 is able to freely rotate relative to the second member 56. The forces causing rotation of the spool 14 is not transferred to the diaphragm 50 since the spool 14 is not firmly secured to the diaphragm 50. Therefore, the diaphragm 50 is not fatigued and has a longer life.

If either one or both of the first and second members 54,56 of the connector member 48 needs to be replaced, it is only necessary to remove the housing 40, the fastener 52 and the snap ring 58. This is made possible since the first and second members 54,56 are easily separated once the fastener 52 has been removed.

The operation of the embodiment of FIG. 2 is the same as that of FIG. 1. The only difference is that the single connector member 48 cannot easily be replaced since the snap ring 48 cannot be easily removed.

In view of the foregoing, it is readily apparent that the structure of the present invention provides a connector mechanism 47 that permit relative rotation between the spool 14 and the diaphragm 50 in an air actuated valve 10.

Other aspects, objects and advantages of this invention can be obtained from a study of the drawings, the disclosure and the appended claims.

We claim:

1. A connector mechanism adapted to permit relative rotation between a spool of an air actuated valve and a diaphragm of an air actuating mechanism, the air actuated valve having a housing, a spool slideably disposed in a bore defined in the housing, and first and second spaced apart ports connected to the bore, the air actuating mechanism having a housing connected to the housing of the air actuated valve, a actuator member connected to the spool at one end thereof, an air chamber, and a diaphragm connected between one of the housings and the actuator member, the connector mechanism comprising:

a connector member firmly connected to the actuator member and the diaphragm at one end thereof and connected at the other end thereof to one end of the spool to permit relative rotation between the connector member and the spool.

2. The connector mechanism of claim 1 wherein the one end of the spool has a blind bore defined therein and the other end of the connector member is slideably disposed in the blind bore and secured therein with a retainer member.

3. The connector mechanism of claim 2 wherein the retainer member is a snap ring disposed in the bore of the spool.

4. The connector mechanism of claim 3 wherein the diaphragm is sealing secured between the housing of the air actuated valve and housing of the air actuating mechanism.

5. The connector mechanism of claim 4 wherein the diaphragm is sealing secured between the actuator member and the one end of the connector member.

6. The connector mechanism of claim 5 including a bearing member disposed between the end of the spool and the connector member.

7. The connector mechanism of claim 5 including a fastener and the connector member is composed of two separate members, the first member being disposed adjacent to the actuator member and the second member being slideably received in the bore of the spool and secured therein by the snap ring and both of the first and second members being secured to the actuator member by the fastener.

* * * * *